US012366415B2

United States Patent
Tsiava et al.

(10) Patent No.: US 12,366,415 B2
(45) Date of Patent: Jul. 22, 2025

(54) HEAT EXCHANGER AND USE THEREOF

(71) Applicant: L'Air Liquide, Société Anonyme pour l'Etude et l'Exploitation des Procédés Georges Claude, Paris (FR)

(72) Inventors: Rémi Tsiava, Saint Germain-les-Corbeil (FR); Jiefu Ma, Bear, DE (US); Meng Hou, Newark, DE (US)

(73) Assignees: L'Air Liquide, Societe Anonyme Pour l'Etude et l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 230 days.

(21) Appl. No.: 18/025,153

(22) PCT Filed: Jul. 26, 2021

(86) PCT No.: PCT/EP2021/070894
§ 371 (c)(1),
(2) Date: Mar. 7, 2023

(87) PCT Pub. No.: WO2022/048824
PCT Pub. Date: Mar. 10, 2022

(65) Prior Publication Data
US 2023/0324125 A1     Oct. 12, 2023

(30) Foreign Application Priority Data
Sep. 7, 2020   (EP) .................................. 20194754

(51) Int. Cl.
F28D 7/02          (2006.01)
(52) U.S. Cl.
CPC ............. *F28D 7/024* (2013.01); *F28D 7/026* (2013.01)

(58) Field of Classification Search
CPC . F28D 7/024; F28D 7/10; F28D 7/026; F23D 5/18; F23D 11/44
(Continued)

(56) References Cited

U.S. PATENT DOCUMENTS 2,061,742 A * 11/1936 Swart ...................... F25B 40/00
                                                      55/490.2
2,888,251 A *  5/1959 Algot ....................... F28D 7/02
                                                      165/DIG. 406
(Continued)

FOREIGN PATENT DOCUMENTS

CN      109268804 A   * 1/2019   ............... B09C 1/06
EP      2 977 699        1/2016
(Continued)

OTHER PUBLICATIONS

International Search Report and Written Opinion for corresponding PCT/EP2021/070894, Aug. 31, 2022.

*Primary Examiner* — Jianying C Atkisson
*Assistant Examiner* — For K Ling
(74) *Attorney, Agent, or Firm* — Justin K. Murray (57) ABSTRACT

A heat exchanger including a shell extending in a longitudinal direction D from a first end to a second end and including a mantle extending from the first end to the second end, and a solid inner core made of a core material and located inside the shell, the core extending in direction D from a first extremity towards the first end to a second extremity towards the second end. Whereby, at least one first flow path is provided inside the core, each first flow path extending from the first extremity to the second extremity of the core, n circuitous second flow paths extend through the core and/or between the core and the mantle, so that the at least one first flow path is surrounded by the n second flow (Continued)

paths over a non-zero rectilinear distance ΔL in direction D, n being an integer greater than 1.

16 Claims, 1 Drawing Sheet

(58) Field of Classification Search
USPC .......................................................... 165/163
See application file for complete search history.

(56) References Cited

U.S. PATENT DOCUMENTS

| | | | | |
|---|---|---|---|---|
| 2,924,203 | A * | 2/1960 | Loebel | F28D 7/024 |
| | | | | 122/411 |
| 4,797,089 | A * | 1/1989 | Schubach | F23N 1/002 |
| | | | | 431/208 |
| 8,414,690 | B2 * | 4/2013 | Hansen | C12M 47/18 |
| | | | | 95/115 |
| 2006/0124285 | A1 * | 6/2006 | Kite | F28F 1/06 |
| | | | | 165/163 |
| 2012/0055421 | A1 * | 3/2012 | Rausch | F24H 8/00 |
| | | | | 122/231 |
| 2013/0112155 | A1 * | 5/2013 | Abdel-Rehim | F28D 20/0034 |
| | | | | 122/15.1 |

FOREIGN PATENT DOCUMENTS

| | | |
|---|---|---|
| EP | 3 026 387 | 6/2016 |
| EP | 3 339 790 | 6/2018 |
| WO | WO 00 31473 | 6/2000 |

\* cited by examiner

HEAT EXCHANGER AND USE THEREOF

CROSS REFERENCE TO RELATED APPLICATIONS

This application is a 371 of International Application No. PCT/EP2021/070894, filed Jul. 26, 2021, which claims priority to European Patent Application No. 20194754.6, filed Sep. 7, 2020, the entire contents of which are incorporated herein by reference.

BACKGROUND

The present invention relates to heat exchangers.

The present invention relates to heat exchangers suitable for the recovery of useful heat from waste heat present in exhaust gases, in particular exhaust gases generated by combustion processes.

It is known in the art to recover waste heat from combustion exhaust gases and to use the heat thus recovered for preheating a combustion reactant, such as the combustion oxidant, before said combustion reactant is consumed in the combustion process.

In the present context, the term "preheating" is used to describe the heating of a fluid, before its final use. In the context of combustion processes, the term "preheating" refers to the heating of a material before its introduction into a combustion chamber/before its subsequent use in particular a combustion process.

In such known processes, distinction is made between, on the one hand, regenerative heat recovery and recuperative heat recovery.

Regenerative heat recovery allows highly efficient recovery of waste heat from combustion exhaust gases. The technology is frequently used with high temperature furnaces, such as heating furnaces for rolling, forging furnaces, heat treatment furnaces and melting furnaces, where it provides reduced fuel consumption and thus reduced energy costs and reduced $CO_2$ emissions.

Such regenerative heat recovery systems generally rely on a pair of alternating combustion units with associated or integrated regenerative heat reservoirs. Each heat reservoir has a hot-side opening towards the combustion chamber and an opposite cold-side opening away from the combustion chamber.

While the first combustion unit is firing and the second combustion unit is not, the combustion exhaust gas generated by the firing first combustion unit passes, from the hot-side opening to the cold-side opening, through the heat reservoir of the non-firing second combustion unit so that said heat reservoir accumulates thermal energy from the exhaust gas and is thereby heated. During the next phase, when the second combustion unit fires and the first combustion unit does not, the combustion oxidant passes from the cold-side opening to the hot-side opening through the heated heat reservoir of said firing second combustion unit and absorbs the thermal energy recovered by said heat reservoir during the previous phase. The combustion oxidant is thus preheated, which improves the combustion efficiency. This causes the heat reservoir of the second combustion unit to cool down progressively. Meanwhile, the combustion exhaust gas generated by the firing second combustion unit passes through the heat reservoir of the non-firing first combustion unit, from its hot-side opening to its cold-side opening, so that the heat reservoir of the non-firing first combustion unit is heated by said exhaust gas until the heating system reverts back to the first phase and so forth and so on.

Due to the progressive cooling of the heat reservoir of the firing fire unit, the temperature to which the combustion oxidant is heated likewise decreases from the beginning till the end of the corresponding firing phase. If significant variations in the temperature to which the oxidant is heated are to be avoided, the duration of the firing phases need to be short and the switching frequency high.

The alternative is to use recuperative heat recovery systems, which do provide for substantially stable temperatures of the preheated combustion oxidant. However, the material constraints for recuperators are such that recuperators are usually operated at oxidant temperatures well below those achieved with regenerators or are inhibitively expensive, in particular when the temperatures and/or the oxygen content of the oxidant are high.

Whereas, with regenerative heat recovery, the use of a same flow path through the heat reservoir for the exhaust gases and the combustion oxidant, albeit in opposite directions and at different moments in time, allows for better heat recovery from the exhaust gas, via the heat reservoir, to the combustion oxidant, the use of a same flow path presents a problem for combustion systems whereby the combustion gas contains a significant load of combustible substances and whereby the oxidant has an oxygen content significantly higher than that of air. Indeed, in that case, direct contact in the heat reservoir between the combustible substances and the oxidant, in particular at the high temperatures therein, may result in potentially catastrophic ignition of said combustibles substances inside the heat reservoir.

In WO-A-2018/114993, it has been proposed to overcome this problem by using a regenerative combustion system with two regenerative-type heat exchangers/reservoirs, which differ from the above-described heat reservoirs in that the flow paths of the combustion gas and of the oxidant in said heat exchangers/reservoirs are physically separated, but in thermal contact with one another. According to a specific embodiment, the oxidant flow paths of both heat reservoirs/exchangers are connected to the oxidant inlet of a same burner.

SUMMARY

The present invention aims to provide a further improved heat exchanger combining the advantages of regenerative and recuperative heat exchangers and processes and installations for the use of such heat exchangers.

The heat exchanger according to the present invention comprises a shell extending in a longitudinal direction D from a first end to a second end and comprising a mantle extending from the first end to the second end. The mantle is typically cylindrical.

A solid inner core made of a core material is located inside the shell. Said core extends in direction D from a first extremity towards the first end to a second extremity towards the second end.

At least one first flow path is provided inside the core. Each first flow path extends from the first extremity of the core to the second extremity of the core.

According to the invention, n circuitous second flow paths extend through the core and/or between the core and the mantle so that the at least one first flow path is surrounded by said n circuitous second flow paths over a non-zero rectilinear distance $\Delta L$ in direction D, whereby n is an integer greater than 1.

The core material thus surrounds each first flow path.

In the case of a second flow path extending through the core, the core material forms the outer wall of said second flow path. In the case of a second flow path extending between the core and the mantle, the outer wall of said second flow path is formed by a combination of the core material and the mantle of the heat exchanger.

When a hot fluid, i.e. a fluid the temperature of which is higher than the temperature of the core, is made to flow through the n second flow paths of the heat exchanger, the core material is thereby heated while the hot fluid is being cooled, in that heat (i.e. thermal energy) present in the hot fluid is absorbed by the core material which is in thermal contact with said n second flow paths. When a cold fluid, i.e. a fluid the temperature of which is lower than the temperature of the core, is made to flow through the at least one first flow path of the heat exchanger, the cold fluid is heated and the core material is being cooled in that heat stored in the core material is absorbed by the cold fluid.

In what follows, the expression "hot fluid" will systematically, and unless explicitly indicated otherwise, be used to designate the fluid used to heat the core material, i.e. from the point where it is fed to the heat exchanger (and before) to the point where it leaves the heat exchanger (and beyond).

Similarly, in what follows, the expression "cold fluid" will systematically, and unless explicitly indicated otherwise, be used to designate the fluid which is heated in the heat exchanger, i.e. from the point where it is fed to the heat exchanger (and before) to the point where it leaves the heat exchanger (and beyond).

The core material of the heat exchanger thus:
- physically separates the at least one first flow path from the n second flow paths, and also separates the first flow paths from one another, in the case of multiple first flow paths;
- defines, optionally together with the mantel of the heat exchanger, the individual second flow paths;
- acts as a heat-storage medium for heat recovered from a hot fluid, when said hot fluid is made to flow through the n second flow paths;
- acts as a heat transfer medium between the hot fluid and a cold fluid, in that, when a cold fluid is made to flow through the at least one first flow path, heat recovered from the hot fluid and absorbed by the core material is transferred to the cold fluid; and
- acts as a thermal buffer, for example in case of changes in the cold fluid flow rate or fluctuations of the flow-rate or temperature of the hot fluid.

By using multiple and circuitous second flow paths for the flow of hot fluid through the heat exchanger, the contact surface area between the hot fluid and the core material is increased, thus enabling a more effective and increased recovery of heat from the hot fluid by the core material. Indeed, for a same total flow path volume, the surface area available for heat transfer of multiple flow paths is greater than the surface area of a single flow path of identical shape.

A 'circuitous' flow path is per definition a non-straight flow path of which the length is longer than the rectilinear distance ΔL over which it extends. For a same flow cross-section and a same rectilinear distance ΔL, a circuitous flow path provides a surface area available for heat transfer which is greater than the surface area for heat transfer provided by a straight flow path over said rectilinear distance ΔL.

The second flow path is typically a serpentine second flow path, i.e. a flow path which presents multiple (≥2, preferably ≥6, more preferably ≥8 or ≥10) turns and/or or twists over the distance ΔL. Such second flow paths may thus have one or more crooked, zigzagging, meandering, convoluted, sinuous and/or spiral sections over said distance ΔL.

The core material is selected:
- so that it is compatible with the hot and with the cold fluid for which the heat exchanger is intended, i.e. the solid material and the fluids (hot and cold) do not react with one another at the temperatures of hot and cold fluid for which the heat exchanger is intended;
- so as to ensure adequate heat-storage capacity of the inner core at the temperatures at which the core will be used, whereby the heat-storage capacity of the inner core further depends on the total mass of the inner core.

The core material advantageously has a specific heat capacity of at least 400 J/(K*kg), preferably of at least 600 J/(K*kg) and more preferably of at least 800 J/(K*kg) at the temperature at which the hot fluid enters the heat exchanger. In many cases, said specific heat capacity will not be higher than 1250 J/(K*kg).

The core material is preferably a refractory material, in particular a ceramic refractory material. For example, the core material may be selected from the group comprising alumina ($Al_2O_3$), silicon carbide (SiC) and cordierite.

The number n of second flow paths is typically from 2 to 16, preferably from 3 to 12, more preferably from 4 to 10 or from 4 to 8.

Distance ΔL usefully corresponds to at least 50% of the rectilinear distance in direction D between the first extremity and the second extremity of the core, preferably to at least 60%, more preferably to at least 80 or 90% of said distance between the first and second extremity and up to the full distance (100%) between the first and second extremity of the core in direction D.

The at least one first flow path may extend in a straight manner from the first extremity to the second extremity of the core. The at least one first flow path may also be non-straight, for example in order to increase the contact surface area between a cold fluid flowing along the at least one first flow path and the core material, thus increasing the heat transfer from the inner core to the cold fluid.

According to one particularly advantageous embodiment, the n second flow paths spiral around the at least one first flow path. However, other configurations are also possible. For example, the at least one first flow path may be surrounded by n second flow paths which extend in a zigzagging or wavy pattern along the distance ΔL.

Advantageously, the length of a second flow path over distance ΔL is at least 1.5*ΔL, more preferably at least 2.5*ΔL, more preferably at least 4*ΔL. The length of a second flow path over distance ΔL can, for example, be up to 20*ΔL, or up to 30*ΔL, and even advantageously up to 40*ΔL.

According to one useful embodiment, each second flow path of the heat exchanger extends from an inlet at the first extremity of the core to an outlet at the second extremity of the core. In that case, the heat exchanger typically has a hot-fluid feed (or inlet) in the first end or in the mantle on the side of the first end and a hot-fluid exit in the second end or on in the mantle on the side of the second end.

Having a hot-fluid feed and a hot-fluid exit at or near opposing ends of the heat exchanger may however, in some cases, be unpractical, for example due to limitations in the available space outside the heat exchanger or because it is desired to limit the flow of hot fluids to particular areas within an industrial plant, for example for safety reasons. In that case, it may be desirable to have a hot-fluid feed and a hot-fluid exit at or near a same end of the shell.

Thereto, according to one embodiment, when the second flow paths extend from an inlet at the first extremity of the core to an outlet at the second extremity of the core, the heat exchanger may further comprise a sleeve surrounding the mantle of the shell, whereby at least one return flow path is defined between the mantle and the sleeve, said at least one return flow path being in fluid connection with the outlets of the second flow paths. This allows both the hot-fluid feed and the hot-fluid exit, which is in fluid connection with the return flow path, to be located in the first end of the shell and/or in the mantle on the side of said first end.

According to one embodiment, the heat exchanger may have multiple hot-fluid feeds (or inlets) for feeding hot fluid to the n second flow paths, for example one hot-fluid feed for each individual second flow path and in fluid connection therewith. The n second flow paths may also be grouped into multiple mutually exclusive groups of second flow paths, whereby each hot-fluid feed is fluidly connected with only one of the groups of second flow paths.

Alternatively, the heat exchanger may present a single hot-fluid feed for feeding hot fluid to all n second flow paths and therefore in fluid connection with each of the n second flow paths.

The same considerations apply to the one or more hot-fluid exits for removing hot fluid from the heat exchanger.

According to a useful embodiment of the present invention, an inlet plenum for the hot fluid is provided between the first end of the shell and the first extremity of the core. This inlet plenum is fluidly connected to the inlets of the second flow paths, but is not fluidly connected to the at least one first flow path. Similarly, an outlet plenum for the hot fluid may be provided between the second end of the shell and the second extremity of the core. Such an outlet plenum is fluidly connected to the outlets of the second flow paths, but is again not fluidly connected to the at least one first flow path of the heat exchanger.

Hot fluid entering the heat exchanger via a hot-fluid feed can thus be distributed/divided over the inlets of the second flow paths via the inlet plenum. Hot fluid leaving the different second flow paths via their respective outlets, can thus be collected in the outlet plenum before leaving the heat exchanger via a hot-fluid exit.

It may be advantageous to have such a hot-fluid inlet plenum or hot-fluid outlet plenum surround a cold-fluid transport duct, which extends through the first end of the shell and is fluidly connected with the at least one first flow path at the first extremity of the core. It may similarly be advantageous to have such a hot-fluid inlet plenum or hot-fluid outlet plenum surround a cold-fluid transport duct, which extends through the second end of the shell and is fluidly connected with the at least one first flow path at the second extremity of the core. In particular, one of the hot-fluid inlet plenum and the hot-fluid outlet plenum may surround a first cold-fluid transport duct, which extends through the first end of the shell and is fluidly connected with the at least one first flow path, while the other of the hot-fluid inlet plenum and the hot-fluid outlet plenum surrounds a second cold-fluid transport duct, which extends through the second end of the shell and is fluidly connected with the at least one first flow path at the second extremity of the core.

In such a case, the hot-fluid plenum surrounding a cold-fluid duct constitutes an additional heat-exchange zone of the heat exchanger and provides additional heat exchange between the hot and the cold fluid, when both fluids are made to flow simultaneously through the heat exchanger.

According to a further advantageous embodiment, the n second flow paths extend from an inlet at the first extremity of the core to an outlet also at the first extremity of the core, while, in between the inlet and the outlet, the n second flow paths surround the at least one first flow path over a non-zero rectilinear distance $\Delta L$ in direction D. In other words, the n second flow paths extend from an inlet at the first extremity of the core towards the second extremity of the core and then back to an outlet in the first extremity of the core. This again allows both a hot-fluid feed, which is in fluid connection with the inlets of the second flow paths and a hot-fluid exit, which is in fluid connection with the outlets of the second flow paths, to be located in the first end of the shell or in the mantle on the side of said first end.

In that case, the heat exchanger may comprise:
  a hot-fluid inlet plenum, located between the first end of the shell and the first extremity of the core and fluidly connected to the inlets of the n second flow paths,
and/or
  a hot-fluid outlet plenum, located between the first end of the shell and the first extremity of the core and fluidly connected to the outlets of the n second flow paths,
whereby said inlet plenum, respectively said outlet plenum are not fluidly connected to the at least one first flow path of the heat exchanger.

Said hot-fluid inlet plenum and/or outlet plenum then preferably surround a first cold-fluid transport duct which extends through the first end of the shell and is fluidly connected with the at least one first flow path at the first extremity of the core, thereby providing an additional heat exchange zone in the heat exchanger for heat exchange between the hot and the cold fluid when both are simultaneously made to flow through the heat exchanger. The cold-fluid transport duct may thus be surrounded by a hot-fluid inlet plenum, by a hot-fluid outlet plenum or by a combination of a hot-fluid inlet and a hot-fluid outlet plenum.

According to a preferred embodiment, the heat exchanger comprises multiple first flow paths. In this manner, for a same total first-flow-path volume, the surface area of the core material bordering said total first-flow-path volume, and via which heat can be transferred from the core material to the cold fluid, may be increased.

According to a specific embodiment of the heat exchanger, the use and benefits of which will be described later in this specification, the heat exchanger comprises 2*m first flow paths, whereby m is an integer$\geq 1$, preferably >1.

The integer m may, for example, be $\geq 2$ and $\leq 24$; preferably $\geq 4$ and $\leq 20$, more preferably $\geq 8$ and $\leq 20$.

The 2*m first flow paths may be divided in:
  a first set of m first flow paths and
  a second set of m first flow paths.

The first set of m first flow paths is located on one side of a median plane extending in direction D across the inner core from its first extremity to its second extremity, while the second set of m first flow paths is located on the other side of said median plane.

The heat exchanger according to the present invention may be used to heat a cold fluid upstream of a burner, by means of heat recovered from a hot fluid, such as, in particular, hot combustion gases. The cold fluid may in that case be a combustion reactant, i.e. a fuel or a combustion oxidant, preferably a combustion oxidant. The cold fluid may also be a further gas, in particular an inert gas, such as recycled flue gas or $CO_2$, which is supplied to the burner. In the present context, 'inert gas' refers to a gas which does not participate in the combustion reaction generated by the burner.

The invention thus also relates to a burner unit comprising at least one heat exchanger as described above, which is operatively connected to a burner.

In the present context, "operatively connected" means that the heat exchanger is connected to the burner in such a way that, when the heat exchanger is used to heat a fluid, the so-called "cold fluid", at least part, and preferably all, of the fluid thus heated is supplied to the burner.

Such a burner unit may, in particular, comprise:
a burner and
two heat exchangers according to the present invention, whereby the at least one first flow path of each heat exchanger is fluidly connected via the second extremity of the core and the second end of the shell to a fluid inlet of the burner. The fluid inlet of the burner is selected, depending on the nature of the cold fluid (to be) heated by the heat exchangers, from the group comprising: fuel inlets, combustion-oxidant inlets and inert gas inlets of the burner.

When the heat exchanger comprises two sets of m first flow paths each, as described above, the burner unit may instead comprise:
a burner and
such a heat exchanger.

The first set of m first flow paths and the second set of m first flow paths of the heat exchanger are each fluidly connected via the second extremity of the core and the second end of the shell to a fluid inlet of the burner, said fluid inlet being selected, depending on the nature of the cold fluid to be heated by the heat exchanger, from the group comprising: fuel inlets, combustion-oxidant inlets and inert gas inlets. In that case, the first set and the second set may each be connected to a different inlet of the burner in the same category or to a same inlet of the burner.

The present invention also relates to a process for preheating, by means of one or two of the above-described heat exchangers, a fluid to be injected into a combustion zone.

It is thus, on the one hand, possible to use the heat exchangers according to the present invention similarly to the way conventional recuperators are used for preheating a fluid to be injected into a combustion zone using combustion gas generated by the combustion of fuel with oxidant in the combustion zone. In that case, combustion gas generated in the combustion zone is fed (as hot fluid) to the n second flow paths of the heat exchanger, thereby heating the core material, while simultaneously the fluid to be injected into the combustion zone is fed (as cold fluid) to the at least one first flow path, whereby said fluid is being heated by the heated core material, and the thus heated fluid is injected into the combustion zone.

According to an alternative embodiment, the fluid to be injected into a combustion zone is preheated by means of two heat exchangers according to the invention. According to said embodiment:
combustion gas generated in the combustion zone is fed, as hot fluid, to the n second flow paths of the two heat exchangers, thereby heating the core material of said two heat exchangers,
the fluid to be injected into the combustion zone is made to flow in a time-alternating manner through the at least one first flow path of each of the two heat exchangers, as cold fluid, whereby the fluid to be injected is heated by heat exchange with the heated core material of the heat exchanger through which the fluid flows.

The thus heated fluid is injected into the combustion zone.

In this manner, the fluid is heated in a time-alternating manner, in one and the other of the two heat exchangers, while the combustion gas continuously heats the core material of both said heat exchangers.

When a heat exchanger according to the invention with a first set of m first flow paths and a second set of m first flow paths is used, said heat exchanger may also advantageously be used in the following manner:
combustion gas generated in the combustion zone is fed, as hot fluid, to the n second flow paths of the heat exchanger, thereby heating the core material of the heat exchanger,
the fluid to be injected into the combustion zone is made to flow in a time-alternating manner through the first and the second set of m first flow paths, as cold fluid, whereby the fluid to be injected is heated by heat exchange with the heated core material.

The thus heated fluid is injected into the combustion zone.

Indeed, as the m first flow paths of the first set are grouped together on one side of the median plane, while the m first flow paths of the second set are grouped together on the other side of the median plane, when the fluid to be heated, acting as a cold fluid, is fed to the first set of m first paths, the core material on the same side of the median plane as the first set undergoes the cooling effect of said fluid to a much greater effect than the core material on the other side of the median plane, i.e. on the side of the median plane where the second set is located. Similarly, when the fluid to be heated is fed to the second set of m first paths, the core material on the side of the median plane where the second set is located undergoes the cooling effect of said fluid to a much greater effect than the core material on the opposite side of the median plane, where the first set of m first paths is located.

By thus alternating the flow of the fluid to be heated between the first and the second set of m first paths, a similar effect is obtained as when, as described above, the fluid to be heated is fed, in an alternating manner, to the at least one first flow path of two heat exchangers, however, now with a single heat exchanger. Such an embodiment is particularly useful when the space available for fluid preheating is limited. In addition, heat losses to the environment are reduced, compared to when two distinct heat exchangers are used.

The combustion gas (hot fluid) and the gas to be injected (cold fluid) may both present a global (or overall) flow direction through the heat exchanger(s) from the first end towards the second end of the shell (co-flow operation).

Alternatively, the combustion gas (hot fluid) may present a global flow direction through the heat exchanger(s) from the first end towards the second end, while the gas to be injected (cold fluid) presents a global flow direction from the second end towards the first end of the shell (counter-flow operation).

When both the hot-fluid feed and the hot-fluid exit are located in the first end of the shell or in the mantle on the side of said first end, the gas to be injected may present a global flow direction from the first end towards the second end or from the second end towards the first end of the shell.

When a heat exchanger has a hot-fluid inlet plenum, as described above, the combustion gas is fed to the n second flow paths via the hot-fluid inlet plenum. Similarly, when a heat exchanger has a hot-fluid outlet plenum, as described above, the combustion gas leaving the n second flow paths is removed from the heat exchanger via the hot-fluid outlet plenum.

The heat exchanger may comprise a cold-fluid transport duct via which the fluid to be injected (and which is to be preheated in the heat exchanger) is fed to the heat exchanger, more specifically to the at least one first flow path of the heat exchanger or via which the fluid, which has been preheated in the at least one first flow path, is removed from the heat exchanger. The heat exchanger may also comprise a first and a second cold-fluid transport duct, one of which is used to feed the fluid to be injected (and which is to be preheated in the heat exchanger) to the heat exchanger and the other of which is used to remove the preheated fluid from the heat exchanger.

When the heat exchanger comprises two sets of m first flow paths, the heat exchanger may comprise two cold-fluid transport ducts via which the fluid to be injected (and which is to be preheated in the heat exchanger) is fed in a time-alternating manner to the first and second set of first flow paths of the heat exchanger. When the heat exchanger comprises two sets of m first flow paths to which the fluid to be injected is fed in a time-alternating manner, it is also possible for the heat exchanger to comprise two cold-fluid transport ducts, one of which is used to remove from the heat exchanger fluid which has been heated in one of the two sets of first flow paths, whereas the other of the two ducts is used to remove from the heat exchanger fluid which has been heated in the other of the two sets of first flow paths.

As indicated earlier, the fluid to be injected (cold fluid) may be a neutral gas or a combustion reactant: i.e. a combustion oxidant or a fuel.

A burner may be used for the injection of the preheated fluid into the combustion zone. The combustion zone may, for example, be the combustion zone of a furnace such as a heating furnace for rolling, a forging furnace, a heat treatment furnace or a melting furnace.

The present invention also relates to a combustion installation with one or more heat exchangers as described above for the preheating of a fluid (corresponding to the "cold fluid") to be injected into a combustion zone of the installation by means of combustion gas (corresponding to the "hot fluid") generated by combustion in said combustion installation.

Such an installation comprises a furnace with a combustion zone and a flue or exhaust for extracting combustion gas generated in the combustion zone from the furnace. The installation also includes a piping network or system, one or more injectors for injecting fluid into the combustion zone and at least one heat exchanger according to the present invention with: (a) a hot-fluid feed and a hot-fluid exit in fluid connection with the n second flow paths of the heat exchanger and (b) a cold-fluid feed and a cold-fluid exit in fluid connection with the at least one first flow path of the heat exchanger.

The piping network of the installation is adapted:
to feed combustion gas extracted from the furnace via the flue to the hot-fluid feed of the heat exchanger: and
to feed a fluid to be injected into the combustion zone to the cold-fluid feed of the heat exchanger and to transport said fluid from the cold-fluid exit of the heat exchanger to the injector or to one or more of the injectors for its injection into the combustion zone.

The piping network of the installation may also be adapted to transport combustion gas from the hot-fluid exit of the heat exchanger, possibly via further heat recovery equipment and/or combustion-gas treatment units, to a chimney.

The one or more injectors, or one or some thereof, may be incorporated in a burner.

When the heat exchanger is merely used in the manner of a recuperator, as described above, the piping network is typically adapted to continuously feed the combustion gas and the fluid to the heat exchanger.

When two heat exchangers are used to preheat the fluid in a time-alternating manner, as described earlier, the installation comprises two heat exchangers according to the invention, each with a hot-fluid feed and a hot-fluid exit in fluid connection with the n second flow paths and each with a cold-fluid feed and a cold-fluid exit in fluid connection with the at least one first flow path. The piping network of the installation may then be adapted:
to feed combustion gas extracted from the furnace via the flue to the hot-fluid feed of each of the two heat exchangers (i.e. simultaneously),
to feed a fluid to be injected into the combustion zone in a time-alternating manner to the cold-fluid feed of one and to the other of the two heat exchangers, and
to transport said fluid to be injected from the cold-fluid exit of the heat exchanger to which the fluid to be injected has been fed to the injector or to one or more of the injectors for the injection, by means thereof, of said fluid into the combustion zone.

The piping network of the installation may then also be adapted to transport combustion gas from the hot-fluid exit of each heat exchanger, possibly via further heat recovery equipment and/or combustion-gas treatment units, to a chimney.

When a heat exchanger with a first and a second set of m first flow paths is used to preheat the fluid, as described earlier, said heat exchanger has (a) a hot-fluid feed and a hot-fluid exit in fluid connection with the n second flow paths of the heat exchanger, (b) a first cold-fluid feed and a first cold-fluid exit in fluid connection with the first set of m first flow paths and (c) a second cold-fluid feed and a second cold-fluid exit in fluid connection with the second set of m first flow paths. The piping network of the installation is then adapted:
to feed combustion gas extracted from the furnace via the flue to the hot-fluid feed of the exchanger,
to feed a fluid to be injected into the combustion zone in a time-alternating manner to the first and second cold-fluid feed of the heat exchanger, and
to transport the fluid to be injected from the first cold-fluid exit to the injector or to one or more of the injectors, when the fluid to be injected is fed to the first cold-fluid feed, and to transport the fluid to be injected from the second cold-fluid exit to the injector or to one or more of the injectors, when the fluid to be injected is fed to the second cold-fluid feed.

The piping network of the installation may then also be adapted to transport combustion gas from the hot-fluid exit of the heat exchanger, possibly via further heat recovery equipment and/or combustion-gas treatment units, to a chimney.

The present invention also relates to the use of such an installation, whereby fuel is combusted with oxidant in the combustion chamber of the furnace, whereby combustion gas extracted from the furnace is supplied to the one or more heat exchangers (as the case may be), whereby a fluid is preheated by means of said one or two heat exchangers in the manner described earlier and, whereby the thus preheated fluid is injected into the combustion zone of the furnace.

As indicated earlier, the preheated fluid may be fuel or oxidant to be combusted in the combustion zone, or a different fluid, such as an inert fluid.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
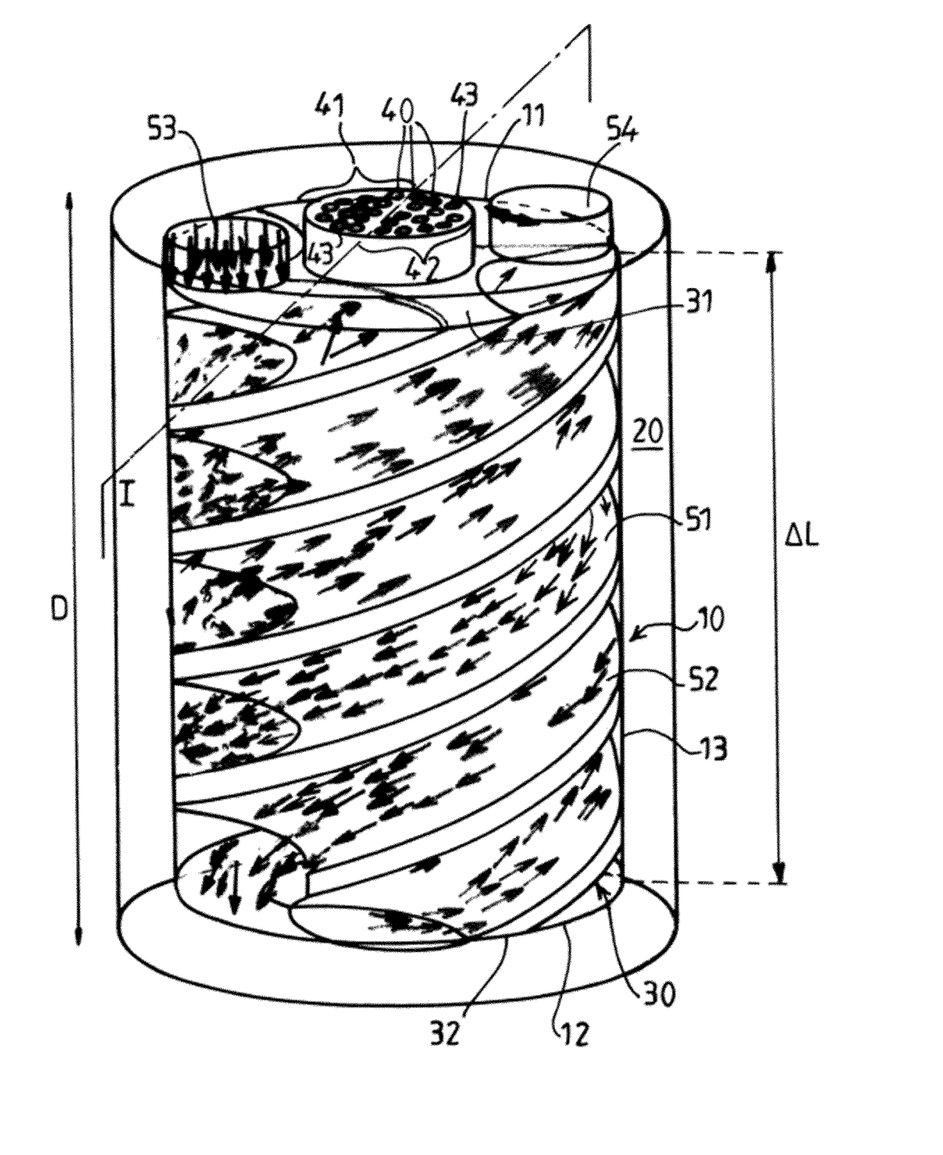
FIG. 1 is a schematic representation of a particular embodiment of a heat exchanger in accordance with the present invention.

The illustrated heat exchanger has a shell 10 extending from a first end 11 to a second end 12. A cylindrical lateral mantle 13 extends in longitudinal direction D, which corresponds to the direction of the axis of the illustrated heat exchanger, from the first end 11 to the second end 12.

The shell is surrounded by a layer 20 of insulating material which reduces heat loss from the heat exchanger to the surrounding environment and thus also protects the personnel in charge of the installation against dangerously high temperatures.

A solid inner core 30 is positioned inside shell 10. Core 30 is made of ceramic material and extends in direction D from a first extremity 31 towards first end 11 to a second extremity 32 towards second end 12.

Twenty-four first flow paths 40 are provided inside core 30, more specifically in the longitudinal center of core 30.

Each first flow path extends from an inlet 43 at the first extremity 31 to an outlet (not shown) at the second extremity 32 of the core 30. The first flow paths 40 are divided in a first set 41 of twelve first flow paths 40, located on the left of plane I in FIG. 1, and a second set 42 of twelve first flow paths 40, shown on the right of plane I in FIG. 1.

In the illustrated embodiment, the first flow paths 40 extend in a rectilinear manner between the first and the second extremities 31, 32 of core 30. However, said first flow paths 40 may, for example, also be curved.

The illustrated heat exchanger has two second flow paths 51, 52. Each second flow path 51, 52 has an inlet at the first extremity 31 of core 30, then extends over the full length of the core up to the second extremity 32 of core 30, before returning to an outlet, which is again located at the first extremity 31 of core 30.

For the sake of clarity, only the inlet 53 and the outlet 54 of second flow path 52 are shown in FIG. 1.

Between their respective inlets 53 and outlets 54, the two second flow paths 51, 52 spiral over distance ΔL, which, in the illustrated embodiment, corresponds to the entire length of core 30, around the twenty-two first flow paths 40.

In the illustrated embodiment, the two second flow paths 51, 52 extend between core 30 and mantle 13.

Thus, when a hot fluid is made to flow through second flow paths 51, 52, core 30 absorbs thermal energy from said hot fluid as it flows from the inlet 53 to the outlet of said second flow paths 51, 52, causing the temperature of core 30 to rise.

Insulating layer 20 ensures that any heat loss via mantle 13 is reduced to a minimum.

When cold fluid is made to flow through first flow paths 40 of the heated core, the cold fluid absorbs heat which has been stored in core 30, causing core 30 to cool down and the temperature of the cold fluid to rise as it flows from the inlet 43 to the outlet of the different first flow paths 40.

It will be appreciated that due to the heat storage/buffer capacity of core 30, the heat exchanger according to the invention is effective both when the hot fluid and the cold fluid are fed to the heat exchanger continuously, whereby when the respective flow rates and feed temperatures are constant, a heat-exchange equilibrium may be established, and when the heat exchanger is operated in a time-alternating manner between a first phase during which the core is heated by means of hot fluid flowing through the second flow paths, and a second phase, during which the core is cooled by means of cold fluid flowing through the first flow paths.

According to a preferred use of the heat exchanger, the operation alternates between a first phase during which the core is heated by means of hot fluid flowing through the second flow paths, and a second phase, during which the core is cooled by means of cold fluid, while simultaneously continuing the heating of the core by means of the hot fluid. With this operating method, the temperature of the core is maintained within a narrower high-temperature range, so that the temperature to which the cold fluid is heated likewise lies within a higher, narrower temperature range. Typically, when the heat exchanger according to the invention is operated in a time-alternating manner, the heat exchanger is operated in pairs so that when one heat exchanger of the pair is in the first phase, the other heat exchanger of the pair is in the second phase and vice versa. In this manner, a continuous supply of heated cold fluid can be assured.

As mentioned above, the illustrated heat exchanger comprises two spatially separated sets 41, 42 of first flow paths 40.

This enables a time-alternating operation with continuous supply of heated cold fluid by means of a single heat exchanger, in that hot fluid is supplied continuously to the second flow paths 51, 52 of the heat exchanger, while cold fluid is supplied in a time-alternating manner to either only the first set 41 of first flow paths 40 or to only the second set 42 of first flow paths 40. Indeed, in that case, when the cold fluid flows only through first set 41, the cooling effect on core 30 is largely limited to the part of the core on the same side (left-hand side) of plane I, while, when the cold fluid flows only through second set 42, the cooling effect on core 30 is largely limited to the part of the core on the side of plane I where second set 42 is located same side (right-hand side), thereby essentially reproducing the effect of two alternating heat exchangers within a single shell 10.

Shell 10 is typically a metal shell.

As indicated earlier, core 30 is typically ceramic.

The use of a heat exchanger with a core 30 positioned within a shell has particular advantages when the efficiency of the heat exchanger may be affected by physical or chemical deterioration of the inside of the heat exchanger or by partial or complete obstruction of first or second flow paths. This may occur, for example, when the cold or the hot fluid cause erosion or corrosion of the parts of the heat exchanger inside the shell or when the hot fluid contain substances, such as entrained particles and/or condensable substances, which may be deposited within the corresponding flow paths.

By using one or more heat exchangers according to the present invention, it is possible, in such a case, to renovate a heat exchanger without actually replacing the entire heat exchanger and its fluid connections to other parts of the installation, thus reducing renovation costs and down time of the installation.

Indeed, in the case of a heat exchanger according to the invention, which has a core 30 made of the core material positioned within shell 10, it is possible to simply replace the core of the heat exchanger with a new core, while keeping the shell in place. It may be pointed out that when it is not possible to remove core 30 in one piece from shell 10, for example when second flow paths 51, 52 extend between core 30 and mantle 13 and condensable substances in the hot fluid have caused core 30 to stick to mantle 13 along said second flow paths 51, 52, it is possible, during renovation, to break up the old core of core material within the shell and to remove the resulting pieces from the shell before introducing a new core therein.

It naturally remains possible to replace entire heat exchangers during renovation.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A heat exchanger comprising:
   a shell extending in a longitudinal direction D from a first end to a second end and comprising a mantle extending from the first end to the second end, and
   a solid inner core made of a core material and located inside the shell, the core extending in direction D from a first extremity towards the first end to a second extremity towards the second end,
   whereby:
   at least one first flow path is provided inside the core, each first flow path extending from the first extremity to the second extremity of the core,
   n circuitous second flow paths extend through the core and/or between the core and the mantle, so that the at least one first flow path is surrounded by the n second flow paths over a non-zero rectilinear distance $\Delta L$ in direction D, n being an integer greater than 1,
   whereby each second flow path has an outer wall which:
   is formed by the core material when said second flow path extends through the core, and
   is formed by combination of the core material and the mantle of the shell when said second flow path extends between the core and the mantle,
   whereby each second flow path extends from an inlet at the first extremity of the core to an outlet at the first extremity of the core.

2. The heat exchanger according to claim 1, whereby the second flow paths spiral around the at least one first flow path.

3. The heat exchanger according to claim 1, whereby each second flow path extends from an inlet at the first extremity of the core to an outlet at the second extremity of the core.

4. The heat exchanger according to claim 3, further comprising:
   an inlet plenum between the first end of the shell and the first extremity of the core, said inlet plenum being fluidly connected to the inlets of the second flow paths and whereby said inlet plenum is not fluidly connected to the at least one first flow path and/or
   an outlet plenum between the second end of the shell and the second extremity of the core, said outlet plenum being fluidly connected to the outlets of the second flow paths and whereby the outlet plenum is not fluidly connected to the at least one first flow path, the heat exchanger.

5. The heat exchanger according to claim 1, further comprising an inlet plenum and/or an outlet plenum between the first end of the shell and the first extremity of the core,
   the inlet plenum being fluidly connected to the inlets of the n second flow paths, but not to the at least one first flow path and
   the outlet plenum being fluidly connected to the outlets of the second flow paths, but not to the at least one first flow path.

6. The heat exchanger according to claim 1, comprising 2*m first flow paths, m being an integer $\geq 1$, said 2*m first flow paths being divided in:
   a first set of m first flow paths and
   a second set of m first flow paths,
   the first set being located on one side of a median plane extending in direction D across the core from the first extremity to the second extremity, and the second set being located on the other side of the median plane.

7. A burner unit comprising:
   a burner, and
   two heat exchangers, wherein each of the two heat exchangers comprises:
   a shell extending in a longitudinal direction D from a first end to a second end and comprising a mantle extending from the first end to the second end, and
   a solid inner core made of a core material and located inside the shell, the core extending in direction D from a first extremity towards the first end to a second extremity towards the second end,
   whereby:
   at least one first flow path is provided inside the core each first flow path extending from the first extremity to the second extremity of the core,
   n circuitous second flow paths extend through the core and/or between the core and the mantle, so that the at least one first flow path is surrounded by the n second flow paths over a non-zero rectilinear distance $\Delta L$ in direction D, n being an integer greater than 1,
   whereby each second flow path has an outer wall which:
   is formed by the core material when said second flow path extends through the core, and
   is formed by combination of the core material and the mantle of the shell when said second flow path extends between the core and the mantle,
   whereby the at least one first flow path of each heat exchanger is fluidly connected, via the second extremity of the core and the second end of the shell, to a fluid inlet of the burner.

8. A burner unit comprising:
   a burner, and
   a heat exchanger comprising:
   a shell extending in a longitudinal direction D from a first end to a second end and comprising a mantle extending from the first end to the second end, and
   a solid inner core made of a core material and located inside the shell, the core extending in direction D from a first extremity towards the first end to a second extremity towards the second end,
   whereby:
   at least one first flow path is provided inside the core, each first flow path extending from the first extremity to the second extremity of the core, n circuitous second flow paths extend through the core and/or between the core and the mantle, so that the at least one first flow path is surrounded by the n second flow paths over a non-zero rectilinear distance ΔL in direction D, n being an integer greater than 1, whereby each second flow path has an outer wall which:
is formed by the core material when said second flow path extends through the core, and
is formed by combination of the core material and the mantle of the shell when said second flow path extends between the core and the mantle, wherein the heat exchanger further comprises 2*m first flow paths, m being an integer ≥1, said 2*m first flow paths being divided in:
a first set of m first flow paths and
a second set of m first flow paths,
the first set being located on one side of a median plane extending in direction D across the core from the first extremity to the second extremity, and the second set being located on the other side of the median plane,
whereby the first set of m first flow paths and the second set of m first flow paths are each fluidly connected, via the second extremity of the core and the second end of the shell, to a fluid inlet of the burner.

9. A process for preheating, by means of two heat exchangers according to claim 1, a fluid to be injected into a combustion zone, process whereby:
combustion gas generated in the combustion zone is fed to the n second flow paths of the two heat exchangers, thereby heating the core material of the two heat exchangers,
the fluid to be injected is made to flow in a time-alternating manner through the at least one first flow path of one of the two heat exchangers and through the at least one first flow path of the other of the two heat exchangers, whereby the fluid to be injected is heated by heat exchange with the heated core material of the heat exchanger through which the fluid to be injected flows, and
the thus heated fluid is injected into the combustion zone.

10. A process for preheating, by means of a heat exchanger according to claim 6, a fluid to be injected into a combustion zone, process whereby:
combustion gas generated in the combustion zone is fed to the n second flow paths of the heat exchanger, thereby heating the core material,
the fluid to be injected is made to flow in a time-alternating manner through the first set of m first flow paths and through the second set of m first flow paths, whereby the fluid to be injected is heated by heat exchange with the heated core material, and
the thus heated fluid is injected into the combustion zone.

11. The process according to claim 9, whereby the fluid to be injected is a combustion oxidant, a fuel or an inert fluid.

12. The process according to claim 10, whereby the fluid to be injected is a combustion oxidant, a fuel or an inert fluid.

13. The process according to claim 11, whereby the heated fluid is supplied to a burner for the injection into the combustion zone.

14. The process according to claim 12, whereby the heated fluid is supplied to a burner for the injection into the combustion zone.

15. A combustion installation comprising:
a furnace with a combustion zone and a flue for extracting combustion gas generated in the combustion zone from the furnace,
one or more injectors for injecting fluid in the combustion zone,
a piping network, and
two heat exchangers according to claim 1,
whereby each of the heat exchangers has:
a hot-fluid feed and a hot-fluid exit in fluid connection with the n second flow paths, and
a cold-fluid feed and a cold-fluid exit in fluid connection with the at least one first flow path;
whereby the piping network is adapted:
to feed combustion gas extracted from the furnace via the flue to the hot-fluid inlet of the two heat exchangers,
to feed a fluid to be injected into the combustion zone in a time alternating manner to the cold-fluid feed of one of the heat exchangers and to the cold-fluid feed of the other of the two heat exchangers,
to transport the fluid to be injected from the cold-fluid outlet of the heat exchanger to which said fluid has been fed to at least one of the one or more injectors for the injection into the combustion zone.

16. A combustion installation comprising:
a furnace with a combustion zone and a flue for extracting combustion gas generated in the combustion zone from the furnace,
one or more injectors for injecting fluid in the combustion zone,
a piping network, and
a exchanger according to claim 6,
whereby said heat exchangers has:
a hot-fluid feed and a hot-fluid exit in fluid connection with the n second flow paths,
a first cold-fluid feed and a first cold-fluid exit in fluid connection with the first flow paths of the first set, and
a second cold-fluid feed and a second cold-fluid exit in fluid connection with the first flow paths of the second set;
whereby the piping network is adapted:
to feed combustion gas extracted from the furnace via the flue to the hot-fluid inlet of the heat exchanger,
to feed a fluid to be injected into the combustion zone in a time-alternating manner to the first cold-fluid feed and to the second cold-fluid feed,
to transport the fluid to be injected
from the first cold-fluid outlet when the fluid has been fed of the first cold-fluid inlet and
from the second cold-fluid outlet when the fluid has been fed to the second cold-fluid inlet,
to at least one of the one or more injectors for the injection into the combustion zone.

* * * * *